(12) United States Patent
Hwang et al.

(10) Patent No.: US 10,064,087 B2
(45) Date of Patent: Aug. 28, 2018

(54) INTERFERENCE CANCELLATION RECEPTION METHOD

(71) Applicant: LG ELECTRONICS INC., Seoul (KR)

(72) Inventors: Jinyup Hwang, Seoul (KR); Yoonoh Yang, Seoul (KR); Sangwook Lee, Seoul (KR); Suhwan Lim, Seoul (KR); Manyoung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 39 days.

(21) Appl. No.: 15/502,774

(22) PCT Filed: Jul. 29, 2015

(86) PCT No.: PCT/KR2015/007928
§ 371 (c)(1),
(2) Date: Feb. 8, 2017

(87) PCT Pub. No.: WO2016/021868
PCT Pub. Date: Feb. 11, 2016

(65) Prior Publication Data
US 2017/0238206 A1    Aug. 17, 2017

Related U.S. Application Data

(60) Provisional application No. 62/034,788, filed on Aug. 8, 2014.

(51) Int. Cl.
*H04W 28/02* (2009.01)
*H04W 40/16* (2009.01)
(Continued)

(52) U.S. Cl.
CPC ......... *H04W 28/0236* (2013.01); *H04L 5/006* (2013.01); *H04L 5/0048* (2013.01); *H04W 28/04* (2013.01); *H04W 40/16* (2013.01)

(58) Field of Classification Search
CPC .......... H04W 72/082; H04W 28/0236; H04W 40/16; H04W 28/04; H04L 5/0073; H04L 25/0328; H04J 11/005
See application file for complete search history.

(56) References Cited

U.S. PATENT DOCUMENTS

2014/0269246 A1* 9/2014 Yoo ........................... H04J 3/10
370/201

OTHER PUBLICATIONS

PCT International Application No. PCT/KR2015/007928, International Search Report dated dated Nov. 30, 2015, 4 pages.
(Continued)

*Primary Examiner* — Ashley L Shivers
(74) *Attorney, Agent, or Firm* — Lee, Hong, Degerman, Kang & Waimey

(57) ABSTRACT

One disclosure of the present specification provides an interference cancellation reception method. The interference cancellation reception method can comprise the steps of: cancelling an interference caused by a cell-specific reference signal (CRS) from a neighboring cell which is mixed within a signal received from a serving cell; blind-detecting a parameter related to a demodulation reference signal (DMRS) so as to discover whether the signal from the neighboring cell mixed within the received signal is a data channel modulated on the basis of the DMRS; cancelling an interference between the detected DMRS signal and a DMRS signal of the serving cell when the DMRS is detected on the basis of the DMRS-related parameter; blind-detecting a modulation order for the data channel from the neighboring cell; and receiving only the signal from the serving cell through the interference cancellation by the data channel from the neighboring cell on the basis of the modulation order.

10 Claims, 14 Drawing Sheets

(51) Int. Cl.
　　　H04W 28/04　　　(2009.01)
　　　H04L 5/00　　　(2006.01)

(56)　　　　References Cited

OTHER PUBLICATIONS

LTE, 3GPP TS 36.211, V10.4.0, "3rd Generation Partnership Project; Technical Specification Group Radio Access Network; Evolved Universal Terrestrial Radio Access (E-UTRA); Physical Channels and Modulation (Release 10)," Dec. 2011, 101 pgs.
Mediatek Inc., "Higher-layer signalling for NAICS and system impact analysis," 3GPP TSG-RAN WG1 #76bis, R1-141488, Shenzhen, China, Mar. 31-Apr. 4, 2014, 9 pgs.
Broadcom Corporation, "RRC signaling for NAICS," 3GPP TSG-RAN WG1 Meeting #76bis, R1-141508, Shenzhen, China, Mar. 31-Apr. 4, 2014, 6 pgs.
Alcatel-Lucent, Alcatel-Lucent Shanghai Bell, "Considerations on higher-layer signalling for NAICS," 3GPP TSG RAN WG1 Meeting #77, R1-142063, Seoul, Korea, May 19-23, 2014, 6 pgs.
LG Electronics, "Discussion on higher-layer signaling for NAICS," 3GPP TSG RAN WG1 Meeting #77, R1-142162, Seoul, Korea, May 19-23, 2014, 8 pgs.
Ericsson, "4 CRS Port Specification Impact and Performance for NAICS," 3GPP TSG-RAN WG1#77, R1-142321, Seoul, Korea, May 19-23, 2014, 6 pgs.

* cited by examiner

INTERFERENCE CANCELLATION RECEPTION METHOD

CROSS-REFERENCE TO RELATED APPLICATIONS

This application is the National Stage filing under 35 U.S.C. 371 of International Application No. PCT/KR2015/0079828, filed on Jul. 29, 2015, which claims the benefit of U.S. Provisional Application No. 62/034,788, Aug. 8, 2014, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Such LTE may be divided into a frequency division duplex (FDD) type and a time division duplex (TDD) type.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, it is expected that in the next-generation mobile communication system, a small cell having small cell coverage is included in the coverage of a macro cell.

Meanwhile, inter-cell interference may be further increased due to these small cells.

SUMMARY OF THE INVENTION

Accordingly, a disclosure of the specification has been made in an effort to solve the aforementioned problem.

To achieve the object described above, one disclosure of the present invention provides an interference cancellation reception method. The interference cancellation reception method comprises cancelling interference due to a CRS (Cell-specific Reference Signal) from a neighboring cell mixed in a signal received from a serving cell; performing blind detection of a DMRS (DeModulation Reference Signal)-related parameter to check whether the signal from a neighboring cell mixed in the received signal is a data channel modulated on the basis of DMRS; if DMRS is detected on the basis of the DMRS -related parameter, cancelling interference between a detected DMRS signal and a DMRS signal of a serving cell; performing blind detection of a modulation order for a data channel from the neighboring cell on the basis of interference-cancelled DMRS; and receiving only the signal from the serving cell by cancelling interference due to the data channel from the neighboring cell on the basis of the modulation order.

The cancelling interference due to a CRS from a neighboring cell may comprise estimating a channel state with respect to the serving cell and a channel state with respect to the neighboring cell.

The DMRS -related parameter may include one or more of a cell ID (CID), scrambling ID, antenna port number, and SNR (Signal-to-Noise Ratio).

The interference cancellation reception method may further comprise determining whether a signal from a neighboring cell mixed in the received signal corresponds to a data channel based on SFBC (Space Frequency Blocking Coding) if the DMRS is not detected; if the signal from a neighboring cell corresponds to an SFBC-based data channel, performing blind detection of a parameter related to transmission power of the data channel; and determining whether the SFBC-based data channel from the neighboring cell acts as interference. if the SFBC-based data channel from the neighboring cell acts as interference, the method may further comprise receiving only the signal from the serving cell through interference cancellation.

Meanwhile, if the signal from a neighboring cell mixed in the received signal is not an SFBC-based data channel but a codebook-based pre-coded data channel, the method may further comprise performing blind detection of a CRS parameter and determining whether the codebook-based pre-coded data channel from the neighboring cell acts as interference.

The CRS parameter may include one or more of a parameter related to transmission power of the data channel, RI (Rank Index), and PMI (Precoding Matrix Index).

To achieve the object described above, one disclosure of the present invention may include an interference cancellation receiver. The interference cancellation receiver may comprise an RF unit and a processor controlling the RF unit. The processor may be configured to perform a process for cancelling interference due to a CRS (Cell-specific Reference Signal) from a neighboring cell mixed in a signal received from a serving cell; to perform blind detection of a DMRS-related parameter to check whether a signal from a neighboring cell mixed in the received signal is a data channel modulated on the basis of a DMRS (DeModulation Reference Signal); if a DMRS is detected on the basis of the DMRS-related parameter, to cancel interference between a detected DMRS signal and a DMRS signal of a serving cell; to perform blind detection of a modulation order for a data channel from the neighboring cell on the basis of interference-cancelled DMRS; and to receive only the signal from the serving cell by cancelling interference due to the data channel from the neighboring cell on the basis of the modulation order.

According to the disclosure of the present invention, a data interference signal from neighboring cells may be cancelled, and thus SINR of a signal from a serving cell may be improved, obtaining performance enhancement.

DESCRIPTION OF EXEMPLARY EMBODIMENTS

Figure 1:
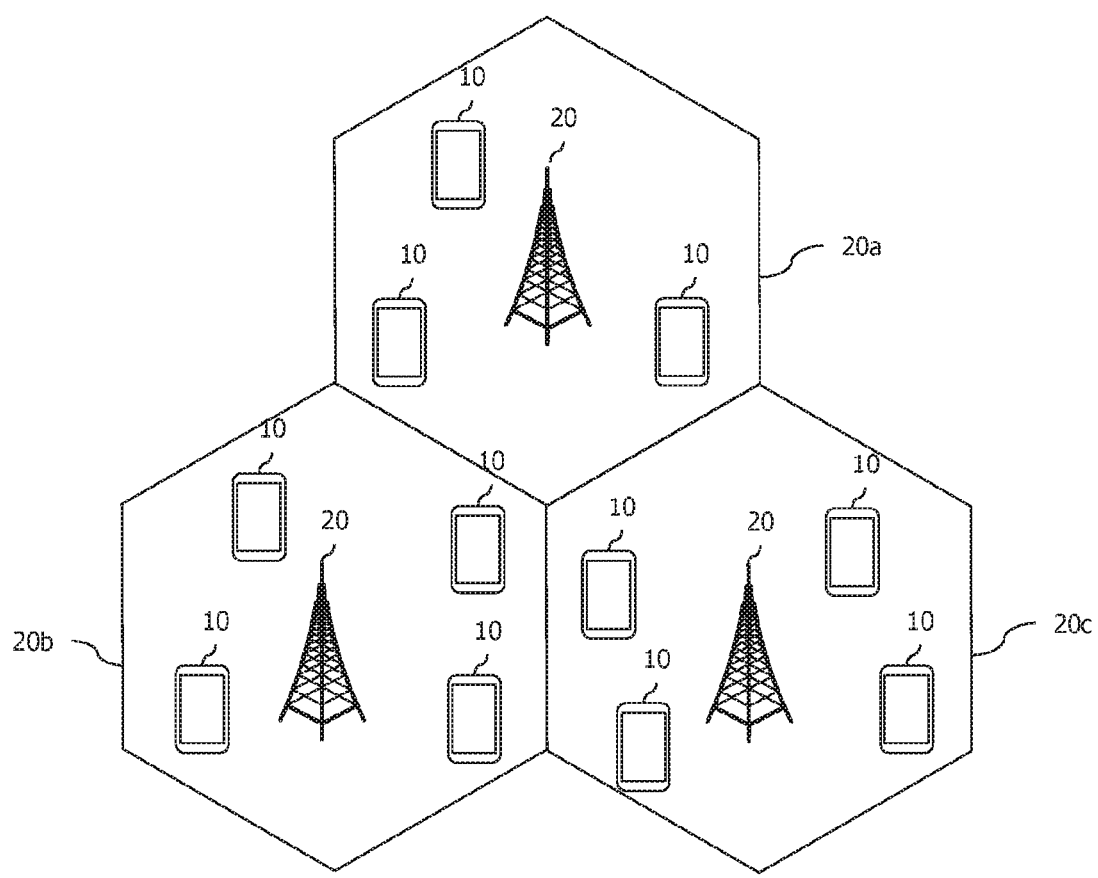
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS(mobile station), UT(user terminal), SS(subscriber station), MT(mobile terminal) and etc.

FIG. 1 illustrates a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Hereinafter, the LTE system will be described in detail.

Figure 2:
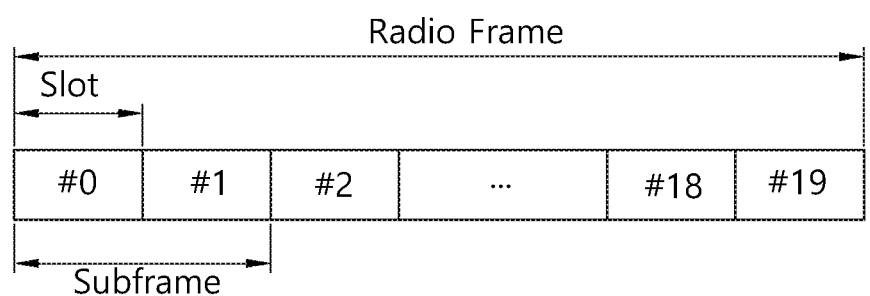
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
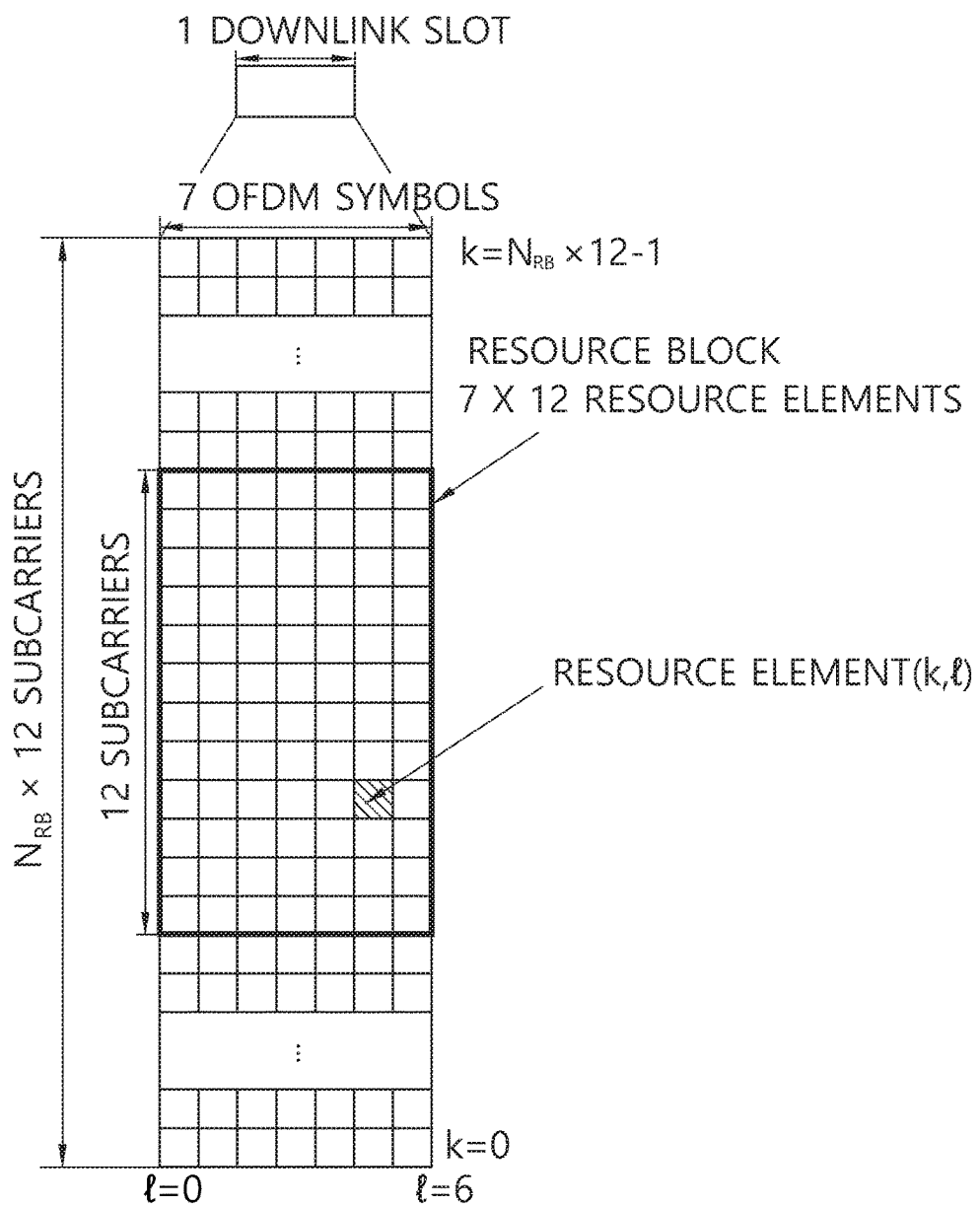
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
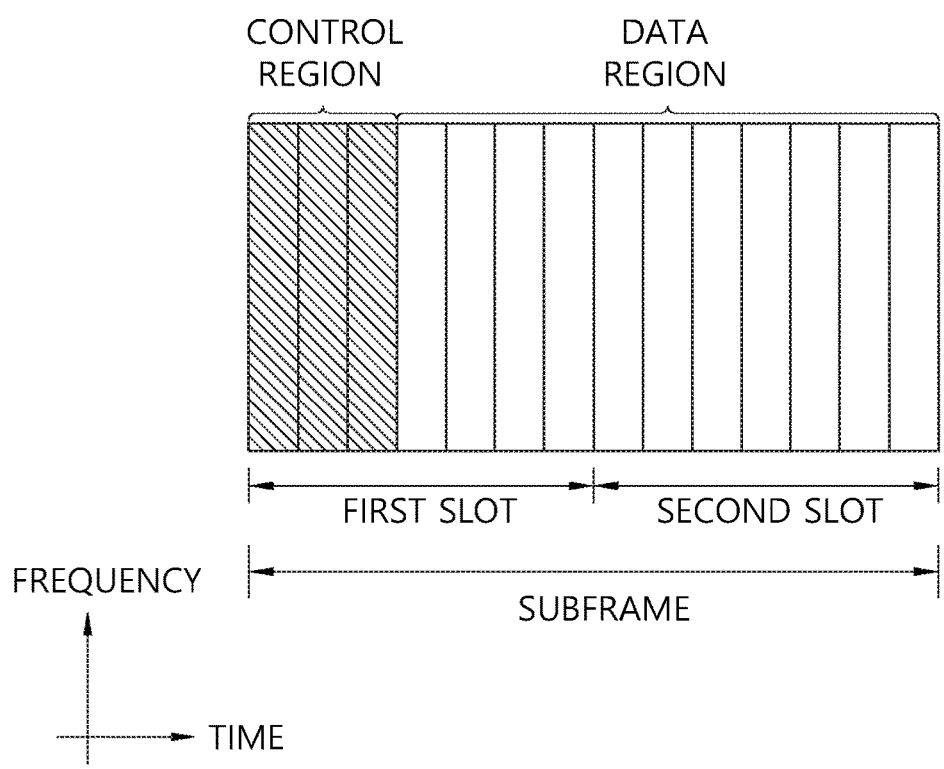
FIG. 4 illustrates the architecture of a downlink subframe.

In 3GPP LTE, the resource grid for one uplink slot shown in FIG. 4 may also apply to the resource grid for the downlink slot.

FIG. 4 illustrates the architecture of a downlink sub-frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 5:
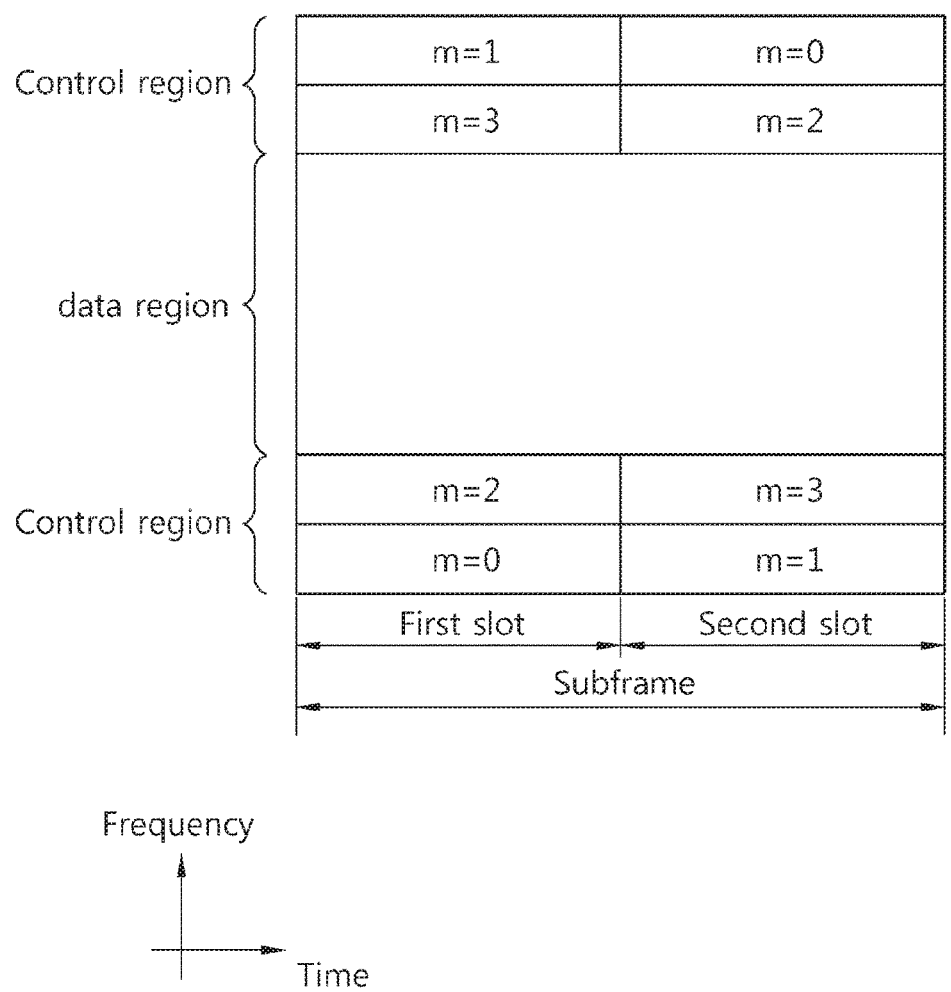
FIG. 5 illustrates the architecture of an uplink subframe in 3GPP LTE.

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator).Or, the uplink data may consist only of control information.

<Carrier Aggregation: CA>

Hereinafter, a carrier aggregation system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

The carrier aggregation system may be divided into a continuous carrier aggregation system in which aggregated carriers are contiguous and a non-contiguous carrier aggregation system in which the aggregated carriers are separated from each other. Hereinafter, when the contiguous and non-contiguous carrier systems are just called the carrier aggregation system, it should be construed that the carrier aggregation system includes both a case in which the component carriers are contiguous and a case in which the component carriers are non-contiguous. The number of component carriers aggregated between the downlink and the uplink may be differently set. A case in which the number of downlink CCs and the number of uplink CCs are the same as each other is referred to as symmetric aggregation and a case in which the number of downlink CCs and the number of uplink CCs are different from each other is referred to as asymmetric aggregation.

When one or more component carriers are aggregated, the component carriers to be aggregated may just use a bandwidth in the existing system for backward compatibility with the existing system. For example, in a 3GPP LTE system, bandwidths of 1.4 MHz, 3 MHz, 5 MHz, 10 MHz, 15 MHz, and 20 MHz are supported and in a 3GPP LTE-A system, a wideband of 20 MHz or more may be configured by using only the bandwidths of the 3GPP LTE system. Alternatively, the wideband may be configured by not using the bandwidth of the existing system but defining a new bandwidth.

Meanwhile, in order to transmit/receive packet data through a specific secondary cell in the carrier aggregation, the UE first needs to complete configuration for the specific secondary cell. Herein, the configuration means a state in which receiving system information required for data transmission/reception for the corresponding cell is completed. For example, the configuration may include all processes that receive common physical layer parameters required for the data transmission/reception, media access control (MAC) layer parameters, or parameters required for a specific operation in an RRC layer. When the configuration-completed cell receives only information indicating that the packet data may be transmitted, the configuration-completed cell may immediately transmit/receive the packet.

The configuration-completed cell may be present in an activation or deactivation state. Herein, the activation transmitting or receiving the data or a ready state for transmitting or receiving the data. The UE may monitor or receive the control channel (PDCCH) and the data channel (PDSCH) of the activated cell in order to verify resources (a frequency, a time, and the like) assigned thereto.

The deactivation represents that transmitting or receiving traffic data is impossible or measurement or transmitting/receiving minimum information is possible. The UE may receive system information SI required for receiving the packet from the deactivated cell. On the contrary, the UE does not monitor or receive the control channel (PDCCH) and the data channel (PDSCH) of the deactivated cell in order to verify the resources (the frequency, the time FIG. 6 illustrates an interference problem between cells.

Figure 6:
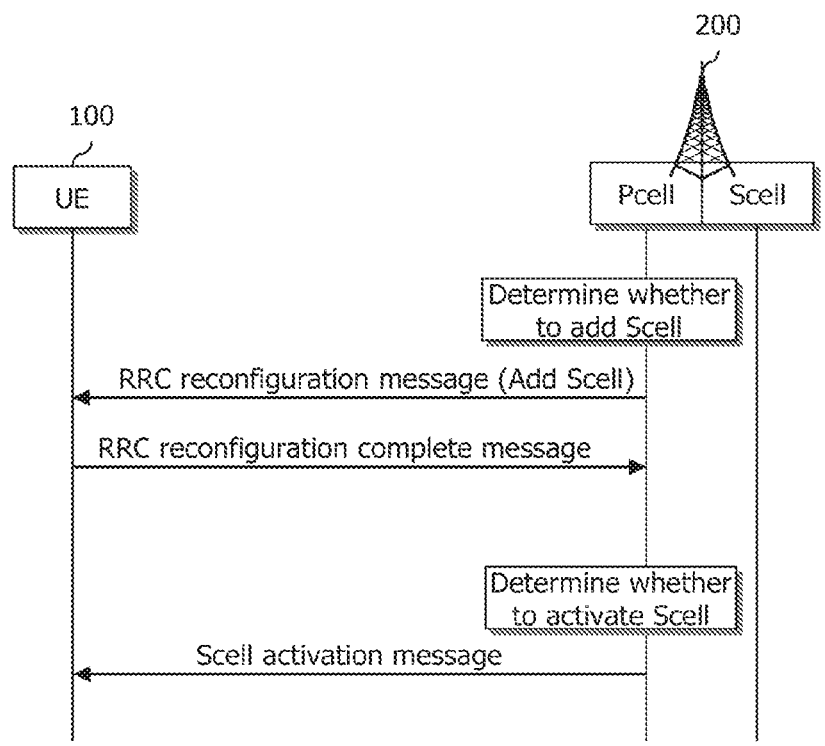
FIG. 6 illustrates an interference problem between cells.

With reference to FIG. 6, in case the UE 100 is located in the overlapping area between coverage of a first cell 200a and coverage of a second cell 200b, a signal of the first cell 200a acts as interference on a signal from the second cell 200b and vice versa.

The most fundamental way to remedy interference problem above is to use different frequencies for the respective cells. However, frequency is a rare and expensive resource, service providers did not quite embraced the solutions based on frequency division.

Therefore, in the 3GPP system, time division techniques were considered as solutions to the inter-cell interference.

Accordingly, in the recent efforts of the 3GPP, eICIC (enhanced Inter-Cell Interference Coordination) is being studied intensively as one of interference cancellation methods.

The time division technique introduced in the LTE Release-10 specification is called enhanced ICIC (Inter-Cell Interference Coordination) in the sense that it has evolved from the existing frequency division technique. In the aforementioned time division technique, a cell causing interference is defined as an aggressor cell or primary cell, and a cell receiving the interference is defined as a victim cell or secondary cell; in a specific subframe, the aggressor cell or primary cell stops data transmission so that a UE may maintain a connection to the victim cell or secondary cell in the corresponding subframe. In other words, in case heterogeneous cells exist in the same space, the method above temporarily stops one of the cells transmitting a signal to the UE receiving considerably high interference in some area, thereby making the cell send virtually no interference signal.

Meanwhile, the specific subframe in which the data transmission is stopped is called an ABS (Almost Blank Subframe), and no data is transmitted in the subframe corresponding to the ABS other than essential control information. The essential control information may be CRS, for example. Therefore, data is not transmitted to the subframe to which the ABS is applied, but only the CRS signal is transmitted to the 0, 4, 7, and 11 symbol.

Figure 7:
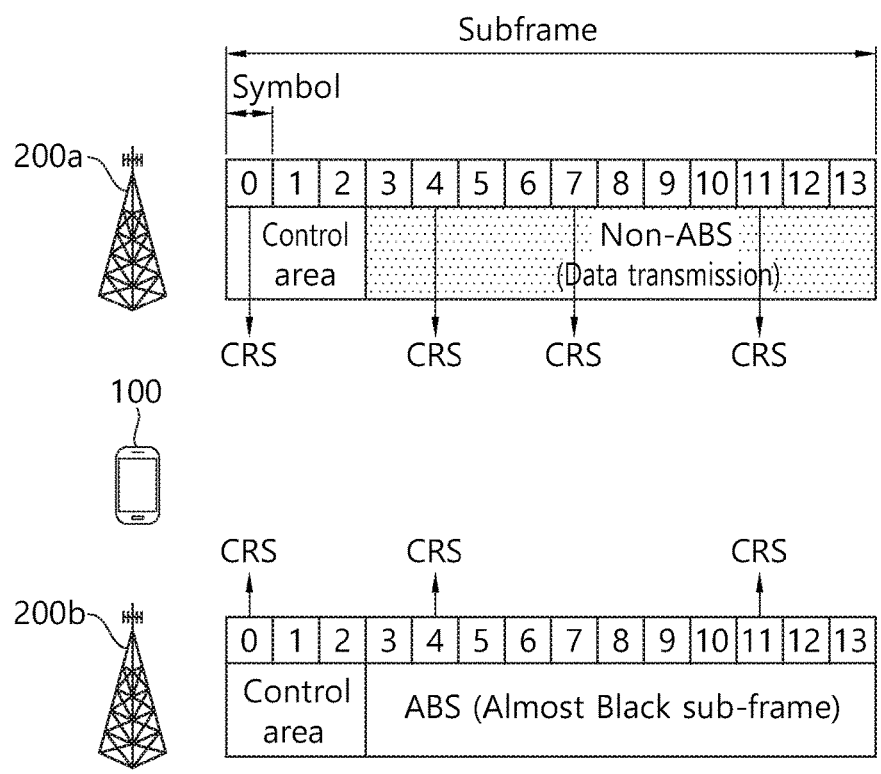
FIG. 7 illustrates eICIC (enhanced Inter-Cell Interference Coordination) for resolving interference between cells.

FIG. 7 illustrates eICIC (enhanced Inter-Cell Interference Coordination) for resolving interference between cells.

With reference to FIG. 7, data transmission is performed in the data area of a subframe denoted as a first cell 200a.

At this time, to cancel interference, a second cell 200b applies eICIC. In other words, if the eICIC is applied, the corresponding subframe is operated as ABS, and thus no data may be transmitted in the data area.

However, only the CRS may be transmitted to the 0, 4, 7, and 11 symbol in the subframe operated according to the ABS scheme.

<Introduction of Small Cell>

Meanwhile, in the next generation mobile communication system, small cells with small cell coverage are expected to be included in the coverage of existing cells and to process more traffic. Since existing cells provide larger coverage than that of the small cell, they are called macro cells. In what follows, descriptions will be given with reference to FIG. 8.

Figure 8:
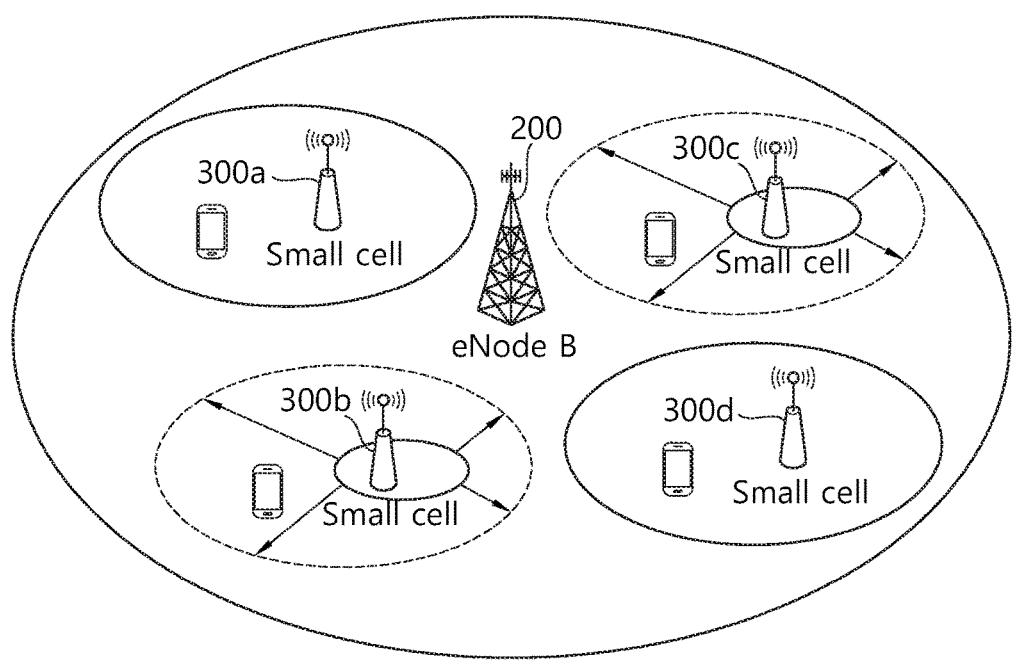
FIG. 8 illustrates a heterogeneous network environment in which a macro cell and small cells are intermixed, which may be evolved to the next-generation wireless communication system.

FIG. 8 illustrates a heterogeneous network environment in which a macro cell and small cells are intermixed, which may be evolved to the next-generation wireless communication system.

FIG. 8 shows a heterogeneous network environment in which a macro cell due to an existing eNodeB 200 comprises one or more overlapping small cells made of small eNodeBs 300a, 300b, 300c, 300d. Since the existing eNodeB provides larger coverage than those of small eNode Bs, it is called a Macro eNodeB (MeNB). In the present document, a macro cell and a macro eNodeB will be used interchangeably. A UE connected to a macro cell 200 may be called a macro UE. A macro UE receives a downlink signal from the macro eNodeB and transmits a uplink signal to the macro eNodeB.

In such a heterogeneous network, by setting the macro cell as a primary cell (Pcell) and the small cell as a secondary cell (Scell), coverage gap of the macro cell may be filled. Also, by setting the small cell as the primary cell (Pcell) and the macro cell as the secondary cell (Scell), the overall performance may be boosted.

Meanwhile, due to introduction of the small cell above, inter-cell interference may be further increased.

As described above, in addition to solving the inter-cell interference problem by using the eICIC scheme, the UE 100 may receive a signal through interference cancellation (in what follows, it is denoted as IC).

Figure 9:
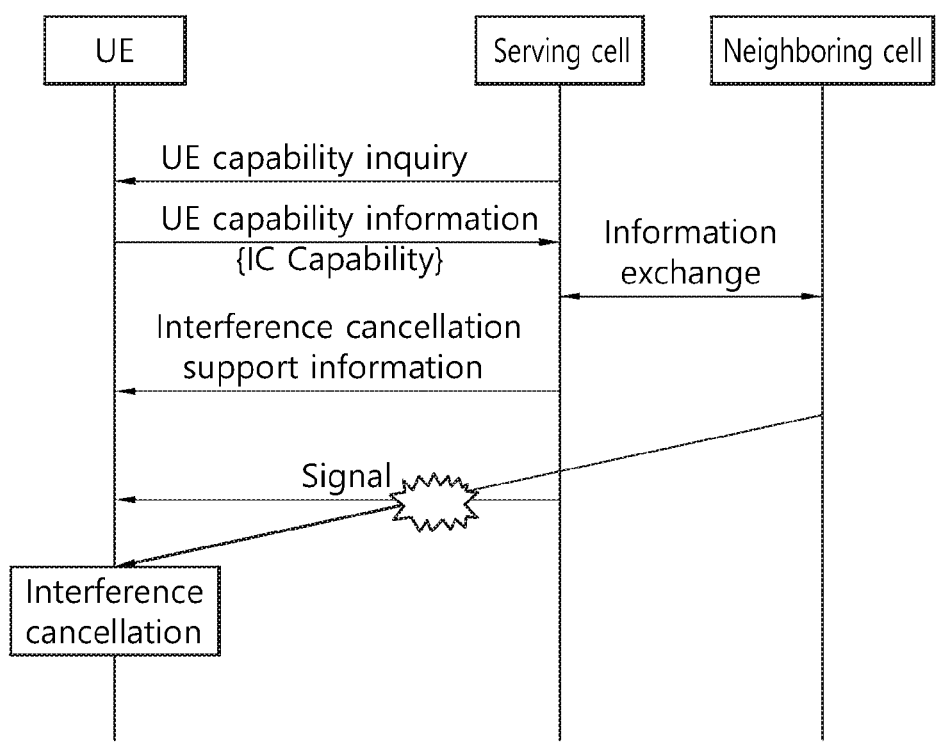
FIG. 9 is a signal flow diagram illustrating an interference cancellation reception method.

FIG. 9 is a signal flow diagram illustrating an interference cancellation reception method.

A serving cell requests a UE performance inquiry from the UE 100 according to the needs or a command from the upper layer.

Then the UE 100 provides UE performance information in response to the request. In other words, in response to the UE performance inquiry, the UE 100 informs the serving cell that it has eICIC capability and interference cancellation (IC) capability through the UE performance information. On the other hand, in case radio access performance of the UE 100 is changed, the upper layer of the UE 100 may command the upper layer of the serving cell to issue a performance inquiry request.

Meanwhile, the serving cell can check whether a neighboring cell is an aggressor cell which causes interference through information exchange with the neighboring cell. In case the neighboring cell is an aggressor cell which causes interference, the serving cell obtains information about an arbitrary channel of the neighboring cell.

Next, in case the serving cell has a signal to transmit to the UE 100, the serving cell transmits interference cancellation support information including information about the obtained arbitrary information to the UE 100.

Next, the serving cell transmits a signal to the UE 100.

At this time, if a signal transmitted by the neighboring cell interferes with a signal transmitted by the serving cell, the UE 100 performs interference cancellation.

Receiving a signal through interference cancellation as described above is called FeICIC (Further Enhanced Inter-Cell Interference Coordination).

In this way, since an interference signal from the neighboring cell is cancelled, SINR of a signal from the serving cell can be enhanced, and thus performance gain may be achieved.

Meanwhile, a target signal or channel for interference cancellation may include CRS (Cell-specific Reference Signal), PBCH (Physical Broadcasting Channel), and SCH (Sync Channel), and PDSCH (Physical Downlink Shared Channel).

On the other hand, in case a target channel for interference cancellation (IC) is PDSCH, the amount of interference cancellation support information that a serving cell has to provide to a UE may become considerably large. Therefore, in case a target channel for interference cancellation is PDSCH, it may be more efficient for the UE to find out information necessary for interference cancellation by itself.

<Disclosure of the Present Invention>

Hereinafter, it will be explained about information about an interference signal that needs to be detected by a receiver to cancel or suppress interference from neighboring cells and operation of an ICS (Interference Cancellation and Suppression) receiver that uses the information.

In particular, in case a target channel for interference cancellation is PDSCH, UE operation to be taken for interference cancellation may differ according to which transmission mode (in what follows, it is called TM) a neighboring cell which causes interference transmits the PDSCH. At this time, first, the receiver has to identify TM through blind detection by using characteristics of an interference signal and then identify the information of the interference data signal related to the TM by blind detection (BD) or obtain the information from network signaling.

The overall operating process for the data interference cancellation receiver to efficiently cancel the interference data signal is as follows.

Figure 10:
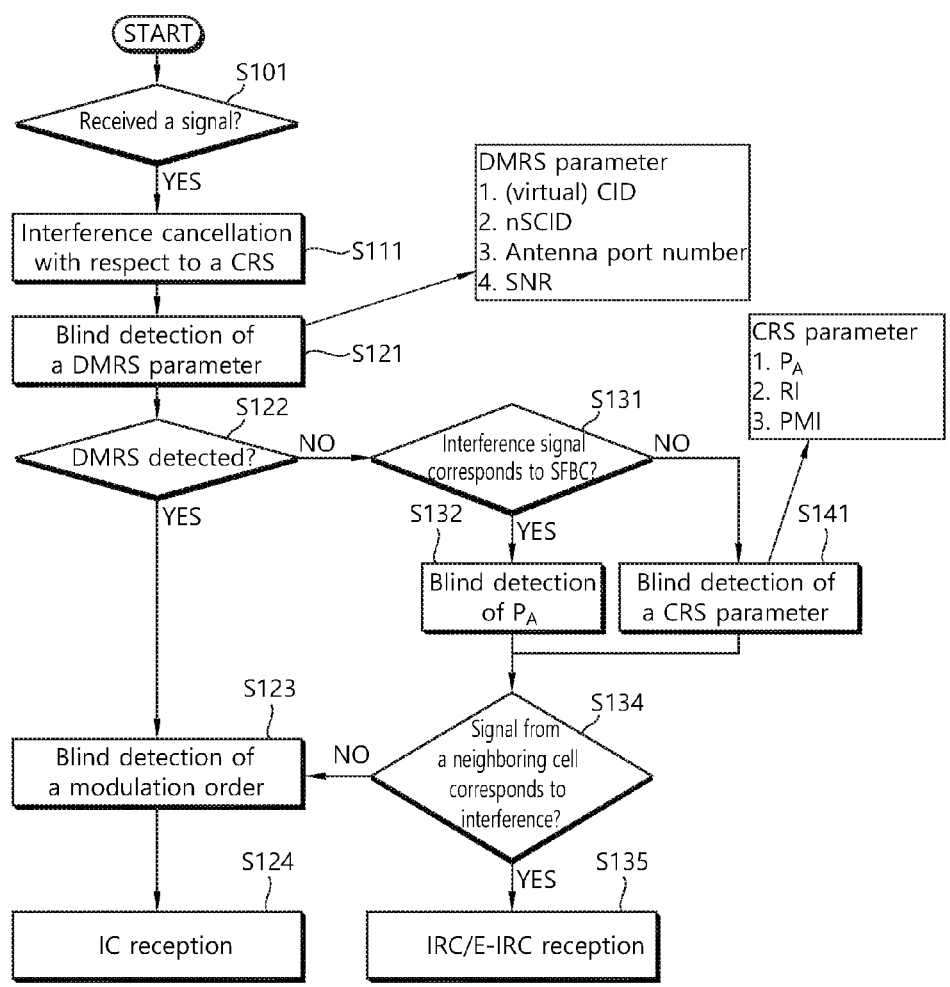
FIG. 10 illustrates an overall operation of the interference cancellation reception method.

FIG. 10 illustrates an overall operation of the interference cancellation reception method.

The overall flow shown in FIG. 10 may be largely divided into 1) an interference cancellation (IC) process about CRS from a neighboring cell S111, 2) an interference cancellation process when a signal from a neighboring cell is a DMRS-based modulated data channel and acts as interference S121-S123, 3) an interference cancellation process when a signal from the neighboring cell is an SFBC (Space Frequency Block Coding)-based data channel based on a CRS and acts as interference S131-S134, S123, S123, and 4) an interference cancellation process when a signal from the neighboring cell is a codebook-based pre-coded data channel and acts as interference S141, S123, S124.

The overall process will be described as follows.

Receiving a signal from the serving cell S101, the receiver performs cancellation of interference due to the CRS from a neighboring cell mixed in the received signal S111. In this process, the channel state with respect to the serving cell is estimated. Also, channel state with respect to the neighboring cell is estimated.

Next, the receiver figures out a DMRS parameter by performing joint blind detection to check whether a signal from a neighboring cell mixed in the signal is a DMRS (DeModulation Reference Signal)-based data channel S121. The DMRS parameter may include a virtual CID (Cell ID), scrambling ID (for example, nSCID), antenna port (AP) number, and SNR.

In case the DMRS is detected on the basis of the DMRS parameter (for example, AP) S122, channel estimation performance is improved by cancelling DMRS signal interference between the serving cell and neighboring cells, after which a signal from a neighboring cell mixed in the received signal is determined as a DMRS -based data channel, and the modulation order for a data channel from the neighboring cell is figured out from blind detection on the basis of the information obtained from the S111 step S123.

Next, the receiver extracts a signal from the serving cell by cancelling a data channel from a neighboring cell mixed in the signal from the serving cell by applying interference cancellation (IC), namely Reduced ML, Symbol-level IC, Interference Rejection Combining (IRC), or Enhanced Interference Rejection Combining (E-IRC) S124. At this time, the detected modulation order is used for the interference cancellation.

However, in case the DMRS is not detected S122, the signal from a neighboring cell mixed in the received signal is regarded as a CRS-based data channel.

In this case, the receiver determines whether the signal from a neighboring cell mixed in the received signal corresponds to an SFBC (Space Frequency Block Coding)-based data channel S131.

In case the signal from a neighboring cell is determined to be an SFBC-based data channel, the receiver finds out the parameter (PA) related to transmission power of the data channel (for example, PDSCH), namely Data to RS EPRE through blind detection S132. Also, the receiver determines whether the data channel from the neighboring cell acts as interference S134. At this time, in case the SFBC-based data channel from the neighboring cell acts as interference, the receiver proceeds to the S123 step. However, in case the SFBC-based data channel from the neighboring cell does not act as interference, the receiver performs IRC or E-IRC, thereby finally receiving a signal from the serving cell S135.

On the other hand, in case the signal from the neighboring cell does not correspond to an SFBC-based data channel S131, the receiver performs joint blind detection for a CRS parameter to determine whether a signal from the neighboring cell mixed in the received signal is a codebook-based pre-coded data channel S141. The CRS parameter includes RI (Rank Indicator), PMI (Precoding Matrix Index), and parameter (PA) related to transmission power of PDSCH. In case the signal from the neighboring cell is a codebook-based pre-coded data channel, the receiver performs the S134 step.

Figure 11A:
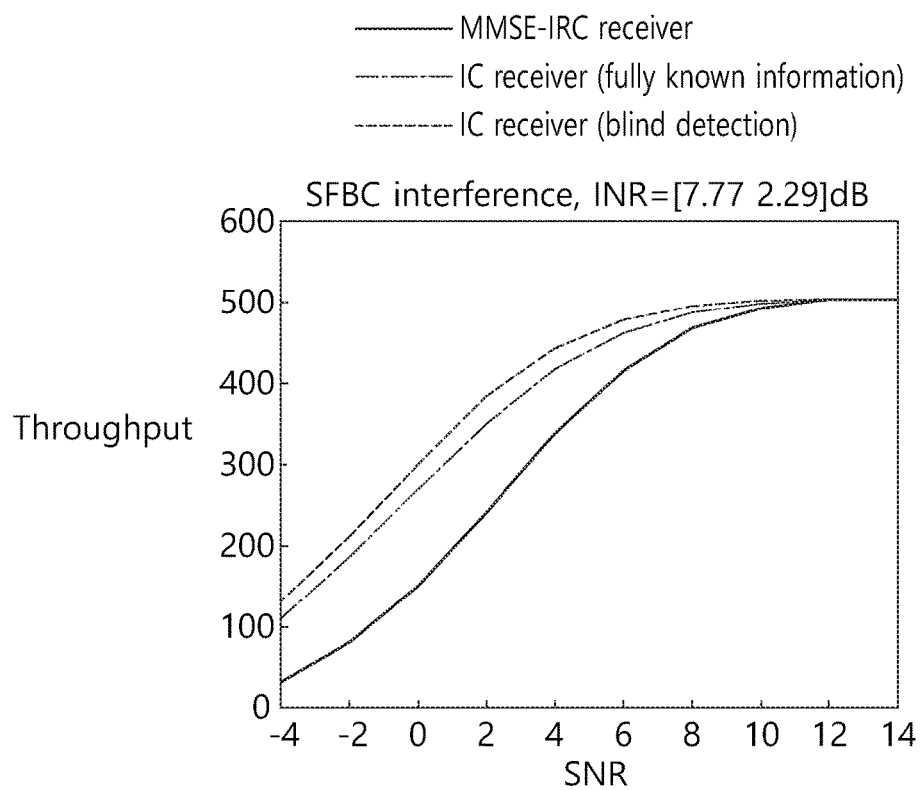
FIG. 11a illustrates performance of interference cancellation according to the present invention in case a signal from a neighboring cell is an SFBC-based data channel.
Figure 11B:
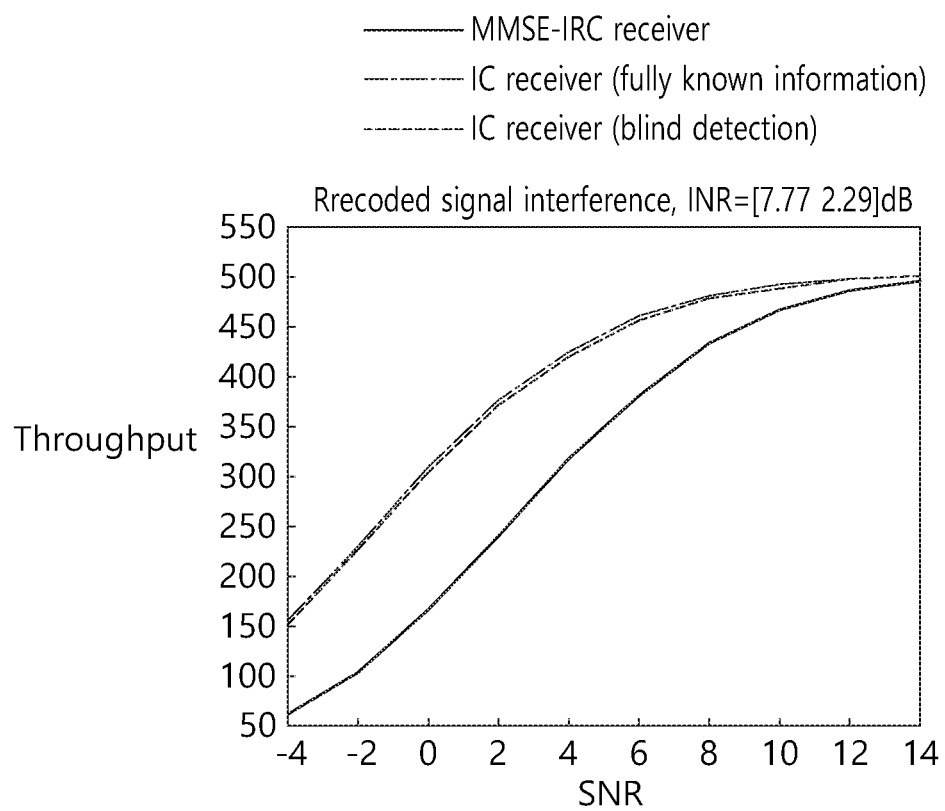
FIG. 11b illustrates performance of interference cancellation according to the present invention in case a signal from a neighboring cell is a codebook-based pre-coded data channel.
Figure 11C:
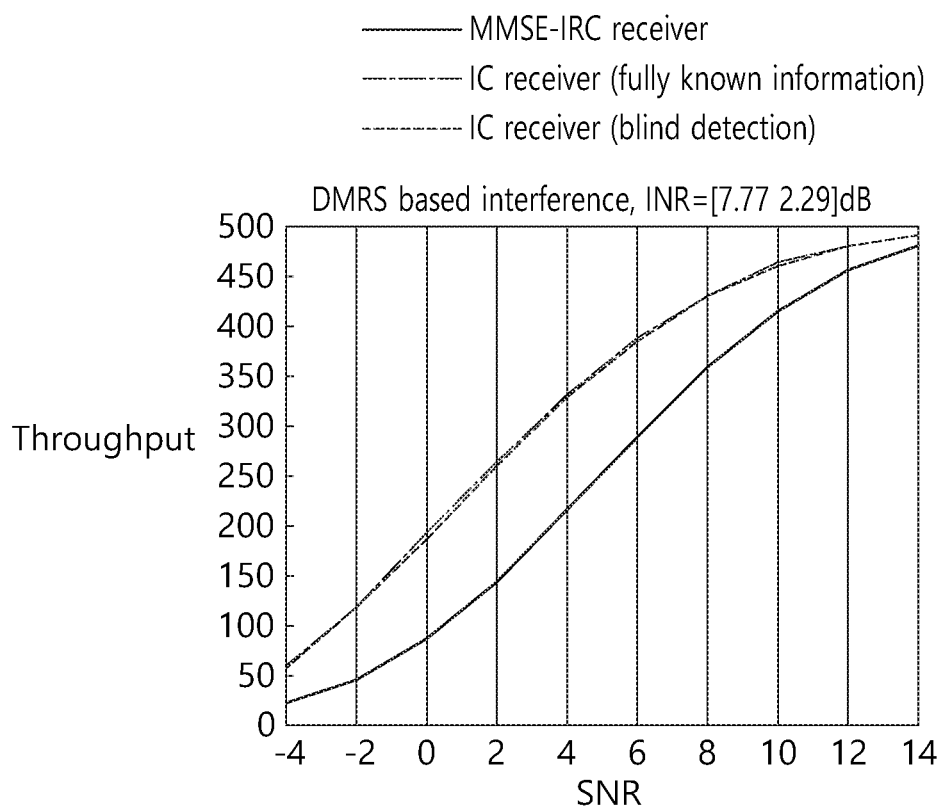
FIG. 11c illustrates performance of interference cancellation according to the present invention in case a signal from a neighboring cell is a DRMS-based data channel.

FIG. 11a illustrates performance of interference cancellation according to the present invention in case a signal from a neighboring cell is an SFBC-based data channel, FIG. 11b illustrates performance of interference cancellation according to the present invention in case a signal from a neighboring cell is a codebook-based pre-coded data channel, and FIG. 11c illustrates performance of interference cancellation according to the present invention in case a signal from a neighboring cell is a DRMS-based data channel.

As shown in FIGs. 11a to 11c, interference cancellation performed when all of the information necessary to perform interference cancellation of PDSCH from a neighboring cell is known in advance, interference cancellation through blind detection, and MMSE (Minimum Mean Square Error)-IRC do not show considerable performance degradation even if interference cancellation is performed through blind detection.

Embodiments of the present invention described above may be implemented through various means. For example, embodiments of the present invention may be implemented by hardware, firmware, software, or a combination thereof. Detailed descriptions will be given with reference to related drawings.

Figure 12:
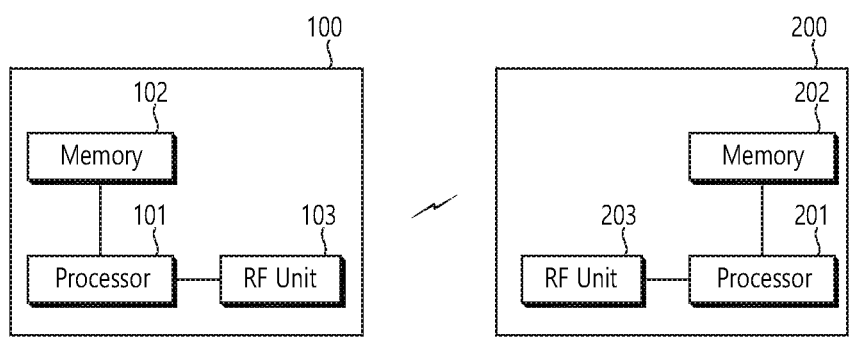
FIG. 12 is a block diagram illustrating a wireless communication system in which a disclosure of the present invention is implemented.

FIG. 12 is a block diagram illustrating a wireless communication system in which a disclosure of the present invention is implemented.

An eNodeB 200 includes a processor 201, memory 202, and RF (Radio Frequency) unit 203. The memory 202, being connected to the processor 201, stores various kinds of information for operating the processor 201. The RF unit 203, being connected to the processor 201, transmits and/or receives a radio signal. The processor 201 implements a proposed function, process and/or method. In the embodiments described above, operation of the eNodeB may be realized by the processor 201.

A UE 100 includes a processor 101, memory 102, and RF (Radio Frequency) unit 103. The memory 102, being connected to the processor 101, stores various kinds of information for operating the processor 101. The RF unit 103, being connected to the processor 101, transmits and/or receives a radio signal. The processor 101 implements a proposed function, process and/or method.

The processor may comprise Application-Specific Integrated Circuit (ASIC), other chipsets, logical circuit, and/or data processing device. The memory may include Read-Only Memory (ROM), Random Access Memory (RAM), flash memory, memory card, storage medium and/or other storage devices. The RF unit may include a baseband circuit for processing a radio signal. If an embodiment is implemented by software, the techniques described above may be implemented in the form of a module (process or function) which performs the function described above. A module may be stored in the memory and may be executed by the processor. The memory may be located inside or outside the processor and may be connected to the processor through a well-known means.

The embodiments of the present invention above are described by using flow diagrams comprising steps or blocks, but the present invention is not limited to the specific order of steps; some steps may be performed in a different order with other steps or may be performed simultaneously with other steps. Also it should be understood by those skilled in the art that the steps introduced in the diagrams are not exclusive to each other, other steps may be added, or one or more steps may be deleted without affecting the technical scope of the present invention.

What is claimed is:

1. An interference cancellation reception method, comprising:

cancelling interference due to a CRS (Cell-specific Reference Signal) from a neighboring cell mixed in a signal received from a serving cell;

performing blind detection of a DMRS (DeModulation Reference Signal)-related parameter to check whether the signal from a neighboring cell mixed in the received signal is a data channel modulated on the basis of DMRS;

cancelling interference between a detected DMRS signal and a DMRS signal of a serving cell;

if the DMRS is detected on the basis of the DMRS-related parameter, performing blind detection of a modulation order for a data channel from the neighboring cell on the basis of interference-cancelled DMRS; and receiving only the signal from the serving cell by cancelling interference due to the data channel from the neighboring cell on the basis of the modulation order.

2. The method of claim 1, wherein the cancelling interference due to a CRS from a neighboring cell comprises estimating a channel state with respect to the serving cell and a channel state with respect to the neighboring cell.

3. The method of claim 1, wherein the DMRS-related parameter includes one or more of a cell ID (CID), scrambling ID, antenna port number, and SNR (Signal-to-Noise Ratio).

4. The method of claim 1, further comprising determining whether a signal from a neighboring cell mixed in the received signal corresponds to a data channel based on SFBC (Space Frequency Blocking Coding) in case the DMRS is not detected;

if the signal from a neighboring cell corresponds to an SFBC-based data channel, performing blind detection of a parameter related to transmission power of the data channel; and determining whether the SFBC-based data channel from the neighboring cell acts as interference.

5. The method of claim 4, further comprising receiving only the signal from the serving cell through interference cancellation in case the SFBC-based data channel from the neighboring cell acts as interference.

6. The method of claim 4, further comprising if the signal from a neighboring cell mixed in the received signal is not an SFBC-based data channel but a codebook-based pre-coded data channel, performing blind detection of a CRS parameter; and determining whether the codebook-based pre-coded data channel from the neighboring cell acts as interference.

7. The method of claim 6, wherein the CRS parameter includes one or more of a parameter related to transmission power of the data channel, RI (Rank Index), and PMI (Precoding Matrix Index).

8. An interference cancellation receiver, comprising:

an RF unit and a processor controlling the RF unit, wherein the processor is configured to perform a process for cancelling interference due to a CRS (Cell-specific Reference Signal) from a neighboring cell mixed in a signal received from a serving cell;

to perform blind detection of a DMRS-related parameter to check whether a signal from a neighboring cell mixed in the received signal is a data channel modulated on the basis of a DMRS (DeModulation Reference Signal);

if a DMRS is detected on the basis of the DMRS-related parameter, to cancel interference between a detected DMRS signal and a DMRS signal of a serving cell;

to perform blind detection of a modulation order for a data channel from the neighboring cell; and to receive only the signal from the serving cell by cancelling interference due to the data channel from the neighboring cell on the basis of the modulation order.

9. The receiver of claim 8, wherein the processor is configured to estimate a channel state with respect to the serving cell and a channel state with respect to the neighboring cell while cancellation of CRS interference from the neighboring cell is being performed.

10. The receiver of claim 9, wherein the DMRS-related parameter includes one or more of a cell ID (CID), scrambling ID, antenna port number, and SNR (Signal-to-Noise Ratio).

* * * * *